US012795561B2

(12) United States Patent
Yuan et al.

(10) Patent No.: US 12,795,561 B2
(45) Date of Patent: Nov. 10, 2026

(54) TECHNIQUES FOR POWER CONTROL WITH UNIFIED TRANSMISSION CONFIGURATION INDICATOR STATES FOR MULTIPLE TRANSMISSION/RECEPTION POINTS

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 18/699,568

(22) PCT Filed: Dec. 22, 2021

(86) PCT No.: PCT/CN2021/140397
§ 371 (c)(1),
(2) Date: Apr. 8, 2024

(87) PCT Pub. No.: WO2023/115380
PCT Pub. Date: Jun. 29, 2023

(65) Prior Publication Data
US 2024/0406889 A1 Dec. 5, 2024

(51) Int. Cl.
*H04W 52/40* (2009.01)
*H04B 7/06* (2006.01)
(Continued)

(52) U.S. Cl.
CPC ........ *H04W 52/40* (2013.01); *H04B 7/06952* (2023.05); *H04W 52/48* (2013.01); *H04W 72/21* (2023.01)

(58) Field of Classification Search
CPC ..... H04W 52/40; H04W 52/48; H04W 72/21; H04W 52/146; H04B 7/06952; H04B 7/0695
See application file for complete search history.

(56) References Cited

U.S. PATENT DOCUMENTS

| | | | | |
|---|---|---|---|---|
| 12,133,181 B2 * | 10/2024 | Kung | .................... | H04L 5/0048 |
| 2021/0235483 A1 | 7/2021 | Park et al. | | |

(Continued)

FOREIGN PATENT DOCUMENTS

| | | |
|---|---|---|
| CN | 110475360 A | 11/2019 |
| CN | 111901020 A | 11/2020 |
| WO | 2021260658 A1 | 12/2021 |

OTHER PUBLICATIONS

International Search Report and Written Opinion—PCT/CN2021/140397—ISA/EPO—Aug. 29, 2022.

(Continued)

*Primary Examiner* — Fayyaz Alam
(74) *Attorney, Agent, or Firm* — ArentFox Schiff LLP

(57) ABSTRACT

Aspects described herein relate to receiving a configuration indicating a first unified transmission configuration indicator (TCI) state for using to transmit a first repetition of a transmission to a first transmission/reception point (TRP) and a second unified TCI state for using the transmit a second repetition of the transmission to a second TRP, transmitting, to the first TRP, the first repetition of the transmission using the first unified TCI state and based on a first set of values for a set of power control parameters, and transmitting, to the second TRP, the second repetition of the transmission using the second unified TCI state and based on a second set of values for the set of power control parameters. Additional aspects relate to transmitting the configuration.

30 Claims, 6 Drawing Sheets

(51) Int. Cl.
*H04W 52/48* (2009.01)
*H04W 72/21* (2023.01)

(56) References Cited

U.S. PATENT DOCUMENTS

| | | | | |
|---|---|---|---|---|
| 2022/0217644 | A1* | 7/2022 | Kung | H04W 52/365 |
| 2024/0373372 | A1* | 11/2024 | Gao | H04W 72/21 |
| 2024/0405957 | A1* | 12/2024 | Deghel | H04B 7/0695 |

OTHER PUBLICATIONS

TCL Communication: "Enhancements on Multi-TRP for PDCCH, PUCCH and PUSCH", 3GPP TSG RAN WG 1 Meeting #104bis-e, R1-2103660, E-meeting, Apr. 12, 2021-Apr. 20, 2021, 7 Pages, Apr. 20, 2021, the whole document.

* cited by examiner

TECHNIQUES FOR POWER CONTROL WITH UNIFIED TRANSMISSION CONFIGURATION INDICATOR STATES FOR MULTIPLE TRANSMISSION/RECEPTION POINTS

CROSS REFERENCE TO RELATED APPLICATION(S)

This application is a National Phase entry of PCT Application No. PCT/CN2021/140397, entitled "TECHNIQUES FOR POWER CONTROL WITH UNIFIED TRANSMISSION CONFIGURATION INDICATOR STATES FOR MULTIPLE TRANSMISSION/RECEPTION POINTS" and filed on Dec. 22, 2021, which is expressly incorporated by reference herein in its entirety.

BACKGROUND

Aspects of the present disclosure relate generally to wireless communication systems, and more particularly, to applying power control commands.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, unified transmission configuration indicator (TCI) states are defined to allow specifying a same TCI state for more than one channel. In addition, power control is provided in uplink channel repetitions schemes where different transmit powers can be used in transmitting repetitions of uplink channel communications to multiple transmission/reception points.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method for wireless communication at a user equipment (UE) is provided that includes receiving a configuration indicating a first unified transmission configuration indicator (TCI) state for using to transmit a first repetition of a transmission to a first transmission/reception point (TRP) and a second unified TCI state for using the transmit a second repetition of the transmission to a second TRP, transmitting, to the first TRP, the first repetition of the transmission using the first unified TCI state and based on a first set of values for a set of power control parameters, and transmitting, to the second TRP, the second repetition of the transmission using the second unified TCI state and based on a second set of values for the set of power control parameters.

In another aspect, a method for wireless communication at a base station is provided that includes transmitting, to a UE, a configuration indicating a first unified TCI state for using to transmit a first repetition of a transmission to a first TRP and a second unified state for using to transmit a second repetition of the transmission to a second TRP, receiving, at the first TRP, the first repetition of the transmission using the first unified TCI state and based on a first set of values for a set of power control parameters, and receiving, at the second TRP, the second repetition of the transmission using the second unified TCI state and based on a second set of values for the set of power control parameters.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

Figure 1:
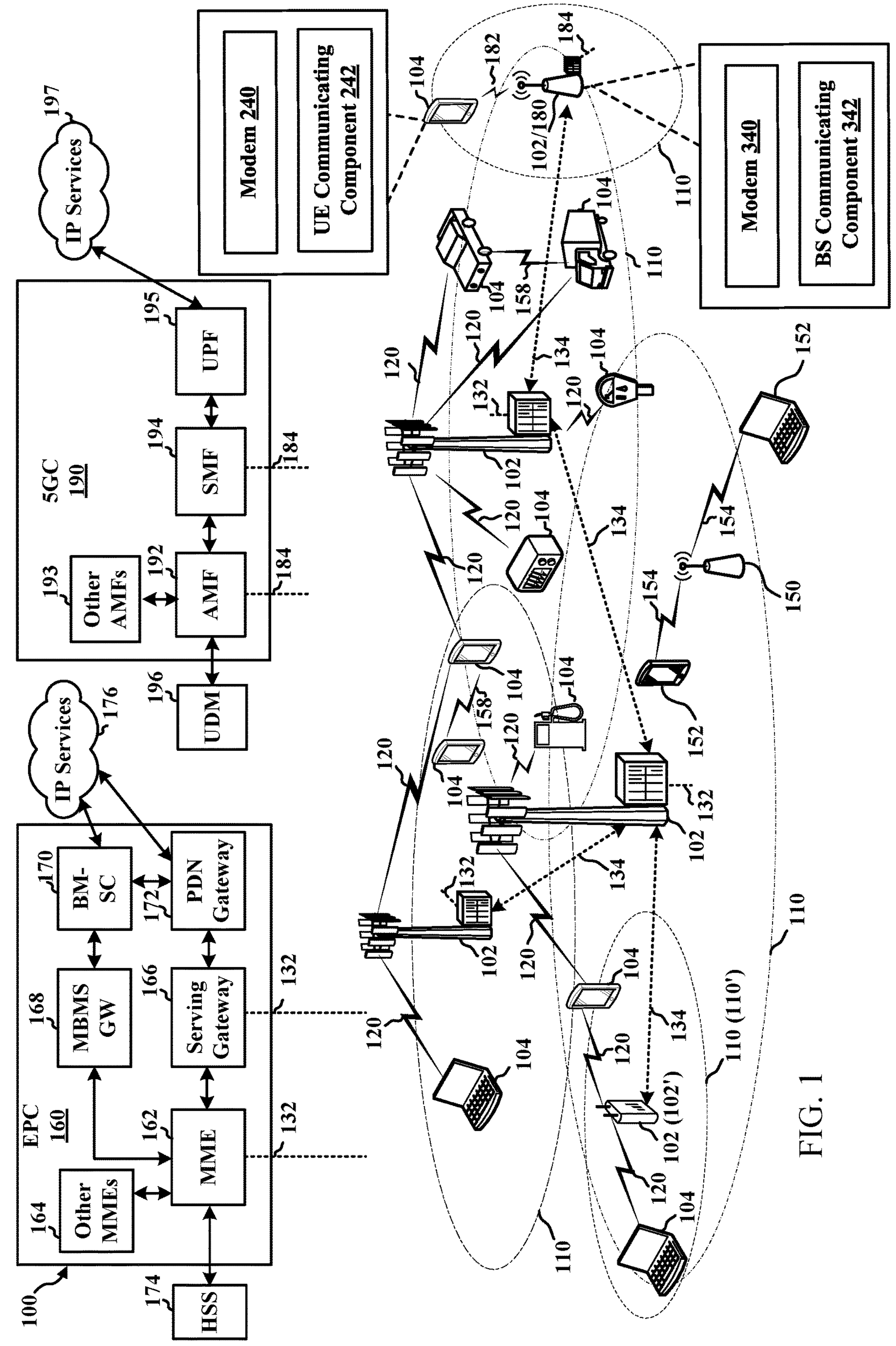
FIG. 1 illustrates an example of a wireless communication system, in accordance with various aspects of the present disclosure.

Additionally, an Appendix is attached that is part of the present disclosure and includes additional description and figures relating to the present disclosure.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to providing power control in unified transmission configuration indicator (TCI) states for transmissions to multiple transmission/reception points (TRPs). For example, some wireless communication technologies, such as in fifth generation (5G) new radio (NR), multiple types of unified TCI states are defined. The multiple unified TCI states may include Type 1: Joint downlink (DL)/uplink (UL) common TCI state to indicate a common beam for at least one DL channel/reference signal (RS) plus at least one UL channel/RS, Type 2: Separate DL common TCI state to indicate a common beam for more than one DL channel/RS, Type 3: Separate UL common TCI state to indicate a common beam for more than one UL channel/RS, Type 4: Separate DL single channel/RS TCI state to indicate a beam for a single DL channel/RS, Type 5: Separate UL single channel/RS TCI state to indicate a beam for a single UL channel/RS, or Type 6: UL spatial relation info (e.g. sounding reference signal (SRS) resource indicator (SRI)) to indicate a beam for a single UL channel/RS. For example, in supporting joint TCI for DL and UL (e.g., according to Type 1 above), the term "TCI" can at least comprise a TCI state that includes at least one source RS to provide a reference (user equipment (UE) assumption) for determining quasi-colocation (QCL) and/or spatial filter as the common beam. In another example, in supporting separate DL common TCI state (e.g., according to Type 2 above), the source reference signal(s) in M TCIs can provide QCL information at least for UE-dedicated reception on physical downlink shared channel (PDSCH) and for UE-dedicated reception on all or subset of control resource sets (CORESETs) in a component carrier (CC). In another example, in supporting separate UL common TCI state (e.g., according to Type 3 above), the source reference signal(s) in N TCIs can provide a reference for determining common UL transmit (TX) spatial filter(s) at least for dynamic-grant/configured-grant based physical uplink shared channel (PUSCH), all or subset of dedicated physical uplink control channel (PUCCH) resources in a CC. Optionally, this UL TX spatial filter can also apply to all SRS resources in resource set(s) configured for antenna switching/codebook-based/non-codebook-based UL transmissions.

In addition, in wireless communication technologies such as 5G NR, for path loss measurement in unified TCI states, a path loss reference signal (PL-RS), which can be configured for path loss calculation, can either be included in UL TCI state or (if applicable) joint TCI state or associated with UL TCI state or (if applicable) joint TCI state. Various parameters for UL power control, other than PL-RS can be configured or otherwise set for unified TCI states, including P0, alpha, closed loop index, etc. For example, P0 can refer to a preconfigured power control target (e.g., a target SINR value), alpha can refer to a fractional power control factor (e.g., between 0 and 1), where 0 can correspond to no path loss compensation and 1 can correspond to full path loss compensation, and the closed loop index can refer to an index of the closed loop power control loop to accumulate the transmit power commands managed by the UE for which the parameters are configured. For each of PUSCH and PUCCH, the setting of the power control parameters (e.g., P0, alpha, closed loop index) can be included or associated with UL or (if applicable) joint TCI state per BWP. In this case, multiple settings can be configured, where each setting can be associated with at least one TCI state, and, for a given TCI state, only one setting for PUSCH and only one setting for PUCCH can be associated at a time, in one example. In this case, for example, each of the PUSCH and PUCCH, each of the activated UL or (if applicable) joint TCI states may be associated with one of the settings. If not associated, for each of the PUSCH and PUCCH, the setting(s) of the power control parameters (e.g., P0, alpha, closed loop index) per channel/signal per bandwidth part (BWP) can be independent of the UL or (if applicable) joint TCI states.

Additionally, in wireless communication technologies such as 5G NR, for single-DCI based multiple TRP (M-TRP) PUSCH repetition schemes, when one SRS resource per SRS resource set is configured (e.g., when two SRI fields are absent in DCI formats 0_1 or 0_2), per TRP default P0, alpha, PL-RS, and closed loop index can be defined as follows. If the UE is provided with an information element (IE) enablePL-RS-UpdateForPUSCH-SRS in a configuration, the first set of values (e.g., the first value in a configured P0-AlphaSet, the PL-RS corresponding to the first configured sri-PUSCH-PowerControl associated with the first SRS resource set and closed loop index 1=0) can be used for the first TRP (TRP1) of the multiple TRPs. In this example, the second set of values (e.g., the second value in the configured P0-AlphaSet, the PL-RS corresponding to the first configured sri-PUSCH-PowerControl associated with the second SRS resource set and closed loop index 1=1 if twoPUSCH-PC-AdjustmentStates is configured, or closed loop index 1=0 otherwise), can be used for the second TRP (TRP2) of the multiple TRPs. Otherwise (e.g., if the UE is not provided with enablePL-RS-UpdateForPUSCH-SRS), the first set of values (e.g., the first value in the configured P0-AlphaSet, the PL-RS with PUSCH-PathlossReferenceRS-Id=0 and closed loop index 1=0) can be used for TRP1, and the second set of values (e.g., the second value in the configured P0-AlphaSet, the PL-RS with PUSCH-PathlossReferenceRS-Id=1 and closed loop index 1=1 if twoPUSCH-PC-AdjustmentStates is configured, or closed loop index 1=0 otherwise) can be used for TRP2.

For open loop power control (OLPC) in wireless communication technologies such as 5G NR for example, an OLPC parameter set indication can be used to indicate which configured OLPC parameter values to use in setting OLPC. For example, the OLPC parameter set indication can be 0 or 1 or 2 bits. In one example, the OLPC parameter can be 0 bit if the higher layer parameter p0-PUSCH-SetList is not configured, or 1 or 2 bits otherwise. In another example, the OLPC parameter can be 1 bit if SRS resource indicator is present in the DCI format 0_1 or 0_2. In yet another example, the OLPC parameter can be 1 or 2 bits as determined by higher layer parameter olpc-ParameterSetDCI-0-1 or olpc-ParameterSetDCI-0-2 if SRS resource indicator is not present in the DCI format 0_1 or 0_2. In addition, in some examples if P0-PUSCH-Set is provided to the UE and the DCI format includes an OLPC parameter set indication field, the UE determines: a value of P0 from a first P0-PUSCH-AlphaSet in p0-AlphaSets if a value of the open-loop power control parameter set indication field is '0' or '00'; a first value in P0-PUSCH-Set with the lowest p0-PUSCH-SetID value if a value of the open-loop power control parameter set indication field is '1' or '01'; a second value in P0-PUSCH-Set with the lowest p0-PUSCH-SetID value if a value of the open-loop power control parameter set indication field is '10'; or the value of the first P0-PUSCH-AlphaSet in p0-AlphaSets.

Moreover, in wireless communication technologies such as 5G NR, OLPC can be configured per-TRP for multiple TRPs. For example, for indicating per-TRP OLPC set in DCI format 0_1 or 0_2, if two SRI fields present in the DCI, an existing field (1 bit) can be used for OLPC set indication and a second p0-PUSCH-SetList-r16. If value of the field equals to '0', the UE can determine value of P0 from SRI-PUSCH-PowerControl with a sri-PUSCH-PowerControlId value mapped to the SRI field value corresponding to each TRP. If value of the field equals to '1', the UE can determine value of P0 from a first value in P0-PUSCH-Set with a p0-PUSCH-SetId value mapped to the SRI field value corresponding to each TRP. If no SRI field presents in the DCI, the existing field (1 or 2 bits) can be used for OLPC set indication and the second p0-PUSCH-SetList-r16. If value of the field equals to '0' or '00', the UE can determine two values of P0 for two TRPs (one P0 value for each TRP) from the first and the second default P0 values. If value of the field equals to '1' or '01', the UE can determine two values of P0 for two TRPs (one P0 value for each TRP) from the first value in the first P0-PUSCH-Set-r16_list and the first value in the second P0-PUSCH-Set-r16_list. If value of the field equals to '10' or '11', the UE can determine two values of P0 for two TRPs (one P0 value for each TRP) from the second value in the first P0-PUSCH-Set-r16_list and the second value in the second P0-PUSCH-Set-r16_list.

According the above examples, per-TRP power control can be supported for multiple TRP operation, and the UE may be configured, or otherwise indicated, with different power control parameters for different TRPs. In addition, for example, the per-TRP power control can be based on SRI indications. Unified TCI states can provide power control parameter indications for single TRP operations. Where multiple TRPs are used, for example, unified TCI states may provide or otherwise be associated or configured with power control parameter indication(s) for multiple TRP operations. A UE may receive a first DCI which provides a unified TCI indication, and secondly receive a second DCI which schedules an uplink transmission for multiple TRP operations.

Aspects described herein can provide for supporting per-TRP power control indication based on unified TCI states for multiple TRP operations. For example, a UE can be configured or indicated with unified TCI states for multiple channels, whether an uplink and downlink channel, separate downlink channels, separate uplink channels, etc., as described above (e.g., Type 1, Type 2, or Type 3). In addition, the UE can be configured or scheduled to transmit multiple repetitions of a transmission to multiple TRPs, and the transmission can be PUSCH or PUCCH. For example, the multiple repetitions can include an initial transmission and at least one repetition (or retransmission) of the initial transmission over the same or different time and/or frequency resources. In this example, the UE can transmit a first repetition (e.g., the initial transmission) to a first one of the multiple TRPs using a first unified TCI state and based on a first set of values for power control parameters (e.g., P0, alpha, PL RS, closed loop index for closed loop power control, P0 for OLPC, etc.), and can transmit a second repetition (e.g., a repetition of the initial transmission) to a second one of the multiple TRPs using a second unified TCI state and based on a second set of values for the power control parameters. In an example, the first set of values and the second set of values can be indicated for, or determined based on, the given TRP to which the repetition is transmitted.

In an example, the UE performing power control per TRP based on unified TCI states can allow for differentiating transmit power for the multiple TRPs and/or unified TCI states used for the uplink transmission to each TRP. This can improve reliability of transmissions from the UE, given that the TRPs may be situated at different locations, which may benefit from different transmit powers by the UE due to distance from the UE or other environmental factors that may affect signals transmitted between the UE and TRP. This can improve the quality of communications, which can accordingly improve user experience when using the UE.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 242 for transmitting repetitions to multiple TRPs using unified TCI states and different values for one or more power control parameters, in accordance with aspects described herein. In addition, some nodes may have a modem 340 and BS communicating component 342 for configuring a UE for transmitting repetitions to multiple TRPs using unified TCI states and different values for one or more power control parameters, in accordance with aspects described herein. Though a UE 104 is shown as having the modem 240 and UE communicating component 242 and a base station 102/gNB 180 is shown as having the modem 340 and BS communicating component 342, this is one illustrative example, and substantially any node or type of node may include a modem 240 and UE communicating component 242 and/or a modem 340 and BS communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an SI interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UE communicating component 242 can receive a configuration (e.g., from base station 102, which may be generated by BS communicating component 342) indicating unified TCI states for transmitting multiple repetitions of a communication (e.g., an initial transmission and one or more repetitions of the initial transmission) to different TRPs. In an example, UE communicating component 242 can transmit the multiple repetitions to each of the multiple TRPs using the unified TCI states and using different values for one or more power control parameters. For example, UE communicating component 242 can determine or select the different values for the one or more power control parameters based on receiving an indication of the values, selecting the values from one or more sets of values based on each TRP (e.g., based on an index associated with the TRP), selecting the values based on a set indication value, etc., as described further herein. In another example, BS communicating component 342 can configure one or more UEs 104 to transmit repetitions of an uplink communication to one or more TRPs using the different values for the one or more power control parameters and based on the unified TCI state.

Figure 2:
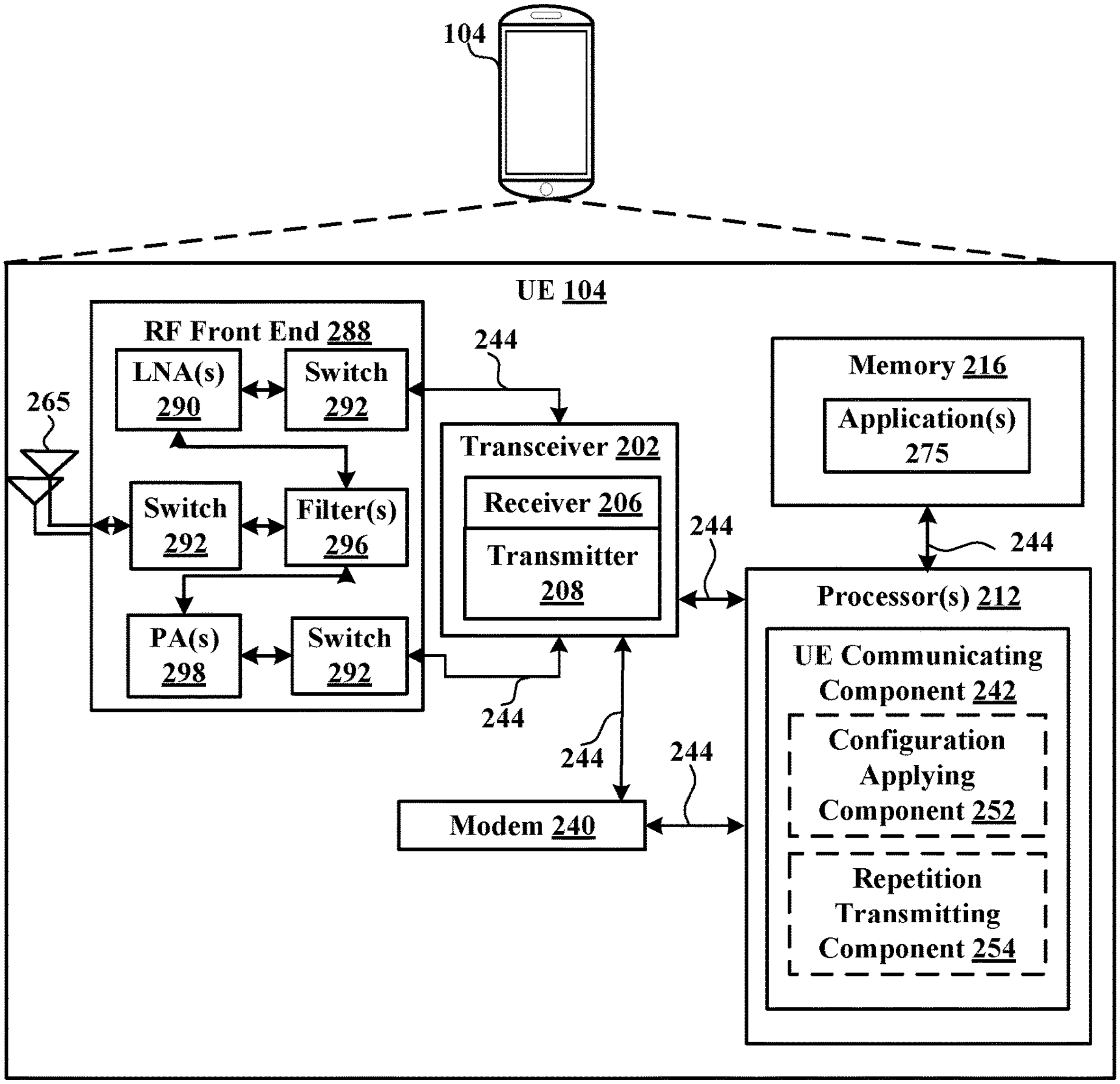
FIG. 2 is a block diagram illustrating an example of a user equipment (UE), in accordance with various aspects of the present disclosure.
Figure 3:
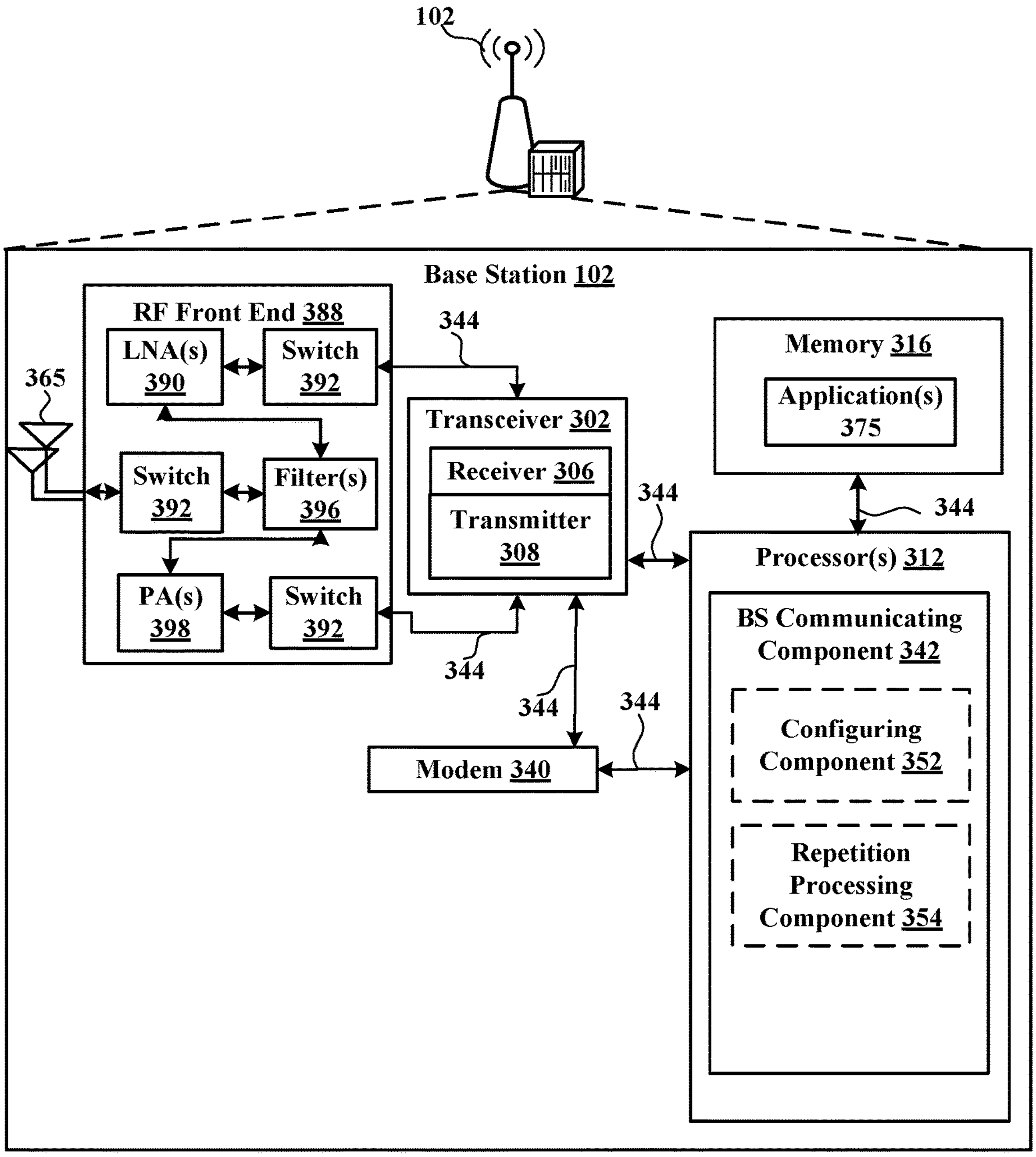
FIG. 3 is a block diagram illustrating an example of a base station, in accordance with various aspects of the present disclosure.
Figure 4:
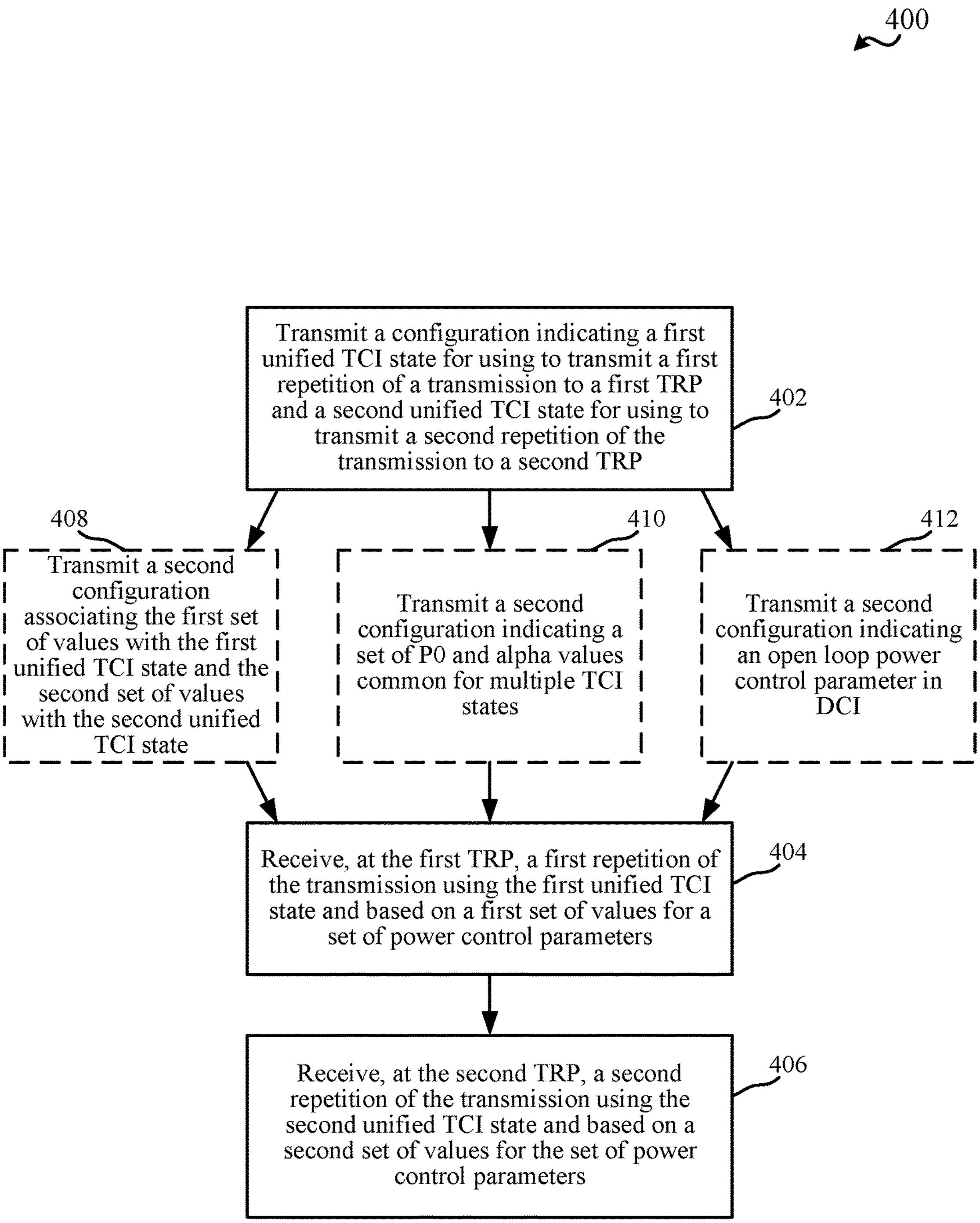
FIG. 4 is a flow chart illustrating an example of a method for configuring a UE for transmitting multiple repetitions to multiple transmission/reception points (TRPs) using unified transmission configuration indicator (TCI) states and different values for one or more power control parameters, in accordance with aspects described herein.
Figure 5:
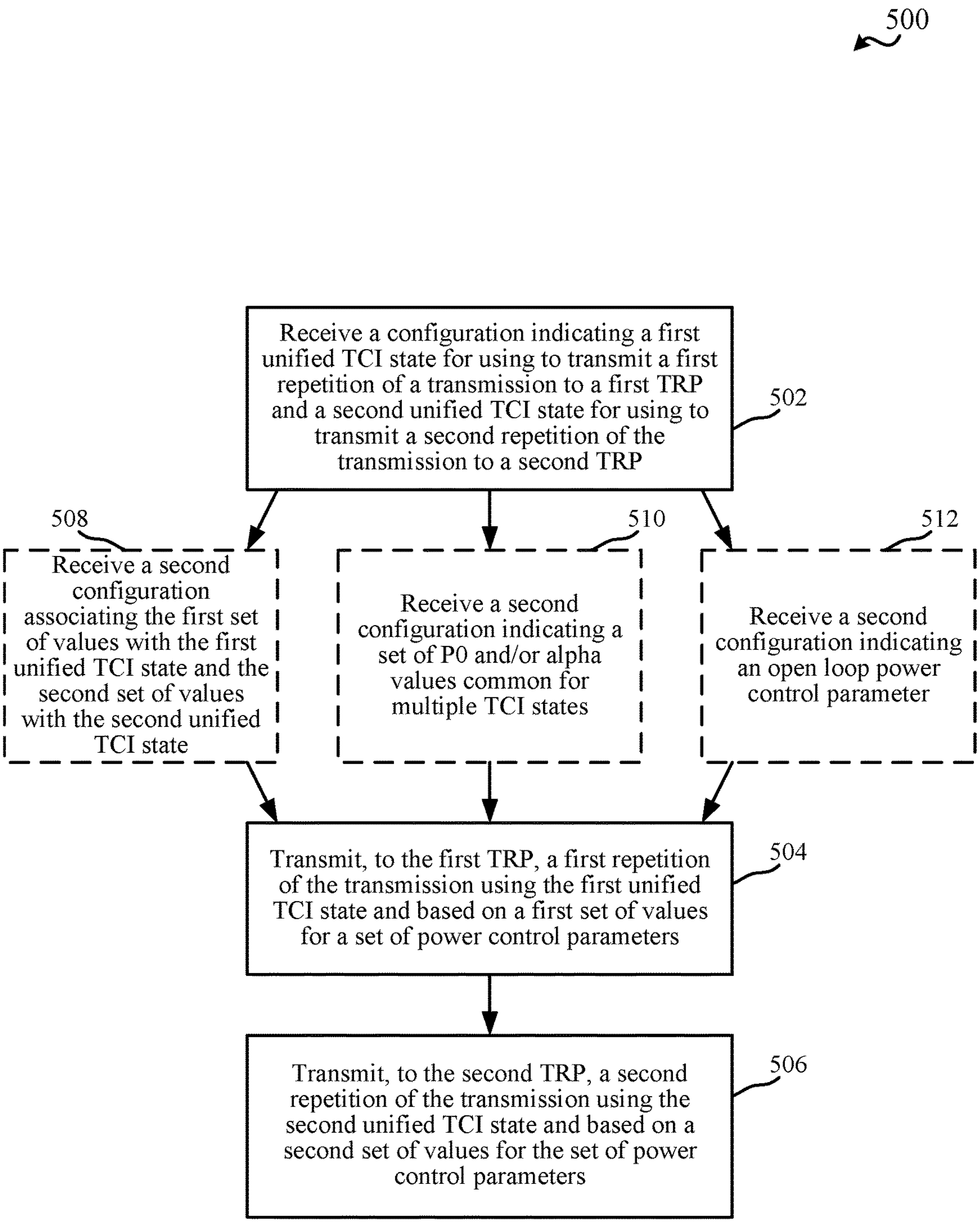
FIG. 5 is a flow chart illustrating an example of a method for transmitting multiple repetitions to multiple TRPs using unified TCI states and different values for one or more power control parameters, in accordance with aspects described herein.

Turning now to FIGS. 2-6, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or UE communicating component 242 for transmitting repetitions to multiple TRPs using unified TCI states and different values for one or more power control parameters, in accordance with aspects described herein.

In an aspect, the one or more processors 212 can include a modem 240 and/or can be part of the modem 240 that uses one or more modem processors. Thus, the various functions related to UE communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with UE communicating component 242 may be performed by transceiver 202.

Also, memory 216 may be configured to store data used herein and/or local versions of applications 275 or UE communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining UE communicating component 242 and/or one or more of its subcomponents, and/or data associated therewith, when UE 104 is operating at least one processor 212 to execute UE communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAS) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 242 can optionally include a configuration applying component 252 for receiving and/or applying a configuration indicating unified TCI states for multiple TRP operations or a configuration indicating or selecting power control parameter values for each of the multiple TRPs, and/or repetition transmitting component 254 for transmitting the multiple repetitions to different TRPs based on the unified TCI states and using different values for power control parameters, in accordance with aspects described herein.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and BS communicating component 342 for configuring a UE for transmitting repetitions to multiple TRPs using unified TCI states and different values for one or more power control parameters, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, BS communicating component 342 can optionally include a configuring component 352 for configuring a UE with one or more parameters for using unified TCI states for transmitting multiple repetitions of an uplink transmission to different TRPs and/or for transmitting the multiple repetitions to the different TRPs based on the unified TCI states and different values for one or more power control parameters, and/or a repetition processing component 354 for receiving and/or processing multiple repetitions received from the UE at the different TRPs, in accordance with aspects described herein.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for configuring a UE for transmitting multiple repetitions to multiple TRPs using unified TCI states and different values for one or more power control parameters, in accordance with aspects described herein. FIG. 5 illustrates a flow chart of an example of a method 500 for transmitting multiple repetitions to multiple TRPs using unified TCI states and different values for one or more power control parameters, in accordance with aspects described herein. Methods 400 and 500 are described in conjunction with one another below simply for case of explanation, though the methods are not required to be performed in conjunction with one another, and indeed different nodes can perform either of method 400 or 500. In an example, a base station 102 can perform the functions described in method 400 using one or more of the components described in FIGS. 1 and 3. In an example, a UE 104 can perform the functions described in method 500 using one or more of the components described in FIGS. 1 and 2.

In method 400, at Block 402, a configuration, indicating a first unified TCI state for using to transmit a first repetition of a transmission to a first TRP and a second unified TCI state for using to transmit a second repetition of the transmission to a second TRP, can be transmitted. In an aspect, configuring component 352, e.g., in conjunction with processor(s) 312, memory 316, transceiver 302, BS communicating component 342, etc., can transmit the configuration indicating the first unified TCI state for using to transmit the first repetition of the transmission to the first TRP and the second unified TCI state for using to transmit the second repetition of the transmission to the second TRP. In an example, configuring component 352 can generate the configuration for the UE 104 and can transmit the configuration to the UE in one or more of radio resource control (RRC) signaling, DCI, etc. For example, configuring component 352 can configure the UE with single DCI based multiple TRP PUCCH or PUSCH operation where the UE is indicated with a pair of unified TCI states for PUCCH or PUSCH repetitions. For example, the configuration may be indicated by a DCI, where the DCI may have a TCI indication field which indicates a pair of joint TCIs or a pair of UL TCIs, and the indicated TCIs are applicable for repetitions of a PUSCH or a PUCCH under multiple TRP operations. For example, the single DCI can activate the unified TCI states, which can be previously configured via RRC, for PUCCH or PUSCH repetitions by specifying an index of the configured unified TCI state. The UE 104 may firstly receive a first DCI which indicates a pair of joint TCIs or a pair of UL TCIs, and may later receive a second DCI scheduling a transmission of PUSCH or PUCCH with repetitions under multiple TRP operations, where the pair of TCIs are applied to transmit different repetitions of PUSCH or PUCCH.

In method 500, at Block 502, a configuration, indicating a first unified TCI state for using to transmit a first repetition of a transmission to a first TRP and a second unified TCI state for using to transmit a second repetition of the transmission to a second TRP, can be received. In an aspect, configuration applying component 252, e.g., in conjunction with processor(s) 212, memory 216, transceiver 202, UE communicating component 242, etc., can receive the configuration indicating the first unified TCI state for using to transmit the first repetition of the transmission to the first TRP and the second unified TCI state for using to transmit the second repetition of the transmission to the second TRP. For example, configuration applying component 252 can receive the configuration from the base station 102 in one or more of RRC signaling, MAC-CE, DCI, etc. As described, for example, the UE 104 can receive the configuration in single DCI based multiple TRP PUCCH or PUSCH operation as a part of unified TCI states for PUCCH or PUSCH repetitions. For example, the UE 104 can receive the DCI scheduling two repetitions for a transmission of PUSCH or PUCCH, where the UE 104 may apply the indicated pair of unified TCIs to transmit the two repetitions to two TRPs, respectively.

For example, the unified TCI states can include a unified TCI state for each of multiple repetitions to be transmitted to each of multiple TRPs. In this example, configuration applying component 252 can select or determine, based on the configuration or a second configuration as described below, power control parameter values to be associated with the transmission of the repetition, using the corresponding unified TCI state, to the given TRP (e.g., for a PUCCH or PUSCH transmission). UE communicating component 242 can transmit the repetitions to the given TRPs and based on the unified TCI states and using the corresponding values for the power control parameters for each unified TCI state and/or TRP.

In method 500, at Block 504, a first repetition of the transmission can be transmitted to the first TRP using the first unified TCI state and based on a first set of values for a set of power control parameters. In an aspect, repetition transmitting component 254, e.g., in conjunction with processor(s) 212, memory 216, transceiver 202, UE communicating component 242, etc., can transmit the first repetition of the transmission to the first TRP using the first unified TCI state and based on the first set of values for a set of power control parameters. For example, the power control parameters may include closed loop power control parameters, such as P0, alpha, closed loop index, PL RS, etc., as described above. In this example, configuration applying component 252 can apply the values to the closed loop power control parameters for the first unified TCI state and can transmit the first repetition to the first TRP using the first unified TCI state for the corresponding uplink channel (e.g., a first beam indicated by the first unified TCI state). In another example, the power control parameters may include OLPC parameters, such as P0 or a set indication for the OLPC. In this example, configuration applying component 252 can apply the values to the OLPC parameters for the first unified TCI state and can transmit the first repetition to the first TRP using the first unified TCI state for the corresponding uplink channel.

In method 500, at Block 506, a second repetition of the transmission can be transmitted to the second TRP using the second unified TCI state and based on a second set of values for the set of power control parameters. In an aspect, repetition transmitting component 254, e.g., in conjunction with processor(s) 212, memory 216, transceiver 202, UE communicating component 242, etc., can transmit the second repetition of the transmission to the second TRP using the second unified TCI state and based on the second set of values for a set of power control parameters. For example, configuration applying component 252 can apply the values to the closed loop power control parameters or OLPC parameters, as described above, and can transmit the second repetition to the second TRP using the second unified TCI state for the corresponding uplink channel (e.g., a second beam indicated by the second unified TCI state).

In method 400, at Block 404, a first repetition of the transmission can be received at the first TRP using the first unified TCI state and based on a first set of values for a set of power control parameters. In an aspect, repetition processing component 354, e.g., in conjunction with processor(s) 312, memory 316, transceiver 302, BS communicating component 342, etc., can receive (e.g., from the UE 104) the first repetition of the transmission to the first TRP, where the base station 102 can provide the first TRP, using the first unified TCI state and based on the first set of values for a set of power control parameters. For example, as described, the power control parameters may include closed loop power control parameters, such as P0, alpha, closed loop index, PL RS, etc., OLPC parameters, such as P0 or a set indication for the OLPC.

In method 400, at Block 406, a second repetition of the transmission can be received at the second TRP using the second unified TCI state and based on a second set of values for the set of power control parameters. In an aspect, repetition processing component 354, e.g., in conjunction with processor(s) 312, memory 316, transceiver 302, BS communicating component 342, etc., can receive (e.g., from the UE 104) the second repetition of the transmission to the second TRP, where base station 102 can provide the second TRP as well, using the second unified TCI state and based on the second set of values for a set of power control parameters.

In one example, the UE may be configured with the separate values for the power control parameters for different TRPs via associating power control parameter values with unified TCIs to an uplink channel (e.g., PUCCH or PUSCH). For example, in method 500, optionally at Block 508, a second configuration associating the first set of value with the first unified TCI state and the second set of values with the second unified TCI state can be received. In an aspect, configuration applying component 252, e.g., in conjunction with processor(s) 212, memory 216, transceiver 202, UE communicating component 242, etc., can receive the second configuration associating the first set of values with the first unified TCI state and the second set of values with the second unified TCI state. For example, configuration applying component 252 can receive the second configuration from the base station 102 in RRC signaling, MAC-CE, DCI, and/or the like. In an example, configuration applying component 252 can apply the first set of values for the power control parameters with the first unified TCI state (and/or the first TRP) for transmitting the first repetition. In addition, for example, configuration applying component 252 can apply the second set of values for the power control parameters with the second unified TCI state (and/or the second TRP) for transmitting the second repetition.

For example, for different repetitions of PUCCH or PUSCH, the UE 104 may be configured or indicated with (e.g., configuration applying component 252 can receive, process, apply, etc. a configuration for) a pair of unified TCIs (joint or UL TCI), where each unified TCI in the pair may be associated with a set of values for power control parameters (P0, alpha, closed loop index) and/or a PL RS for a repetition associated with a TRP in a transmission under multiple TRP operations. In an example, the UE 104 may apply the per-TRP power control for PUCCH or PUSCH when the closed loop index values associated with the pair of unified TCIs are not the same. For example, the UE 104 may apply the two transmit power control commands to different repetitions of a PUCCH or PUSCH under multiple TRP operations when the closed loop index values associated with the pair of unified TCIs are not the same. In an example, a second transmit power command (TPC) field can be configured via RRC signaling for supporting per-TRP power control to PUCCH in a DCI format of 1_1 or 1_2, and/or to PUSCH in a DCI format of 0_1 or 1_2. Thus, in one example, receiving the second configuration can include receiving the second TPC field, along with the first TPC field in a DCI, which can respectively indicate the second transmit power control command and the first transmit power control command. For example, when the second field is configured by RRC, a second TPC field (similar to the first TPC field) can be added in DCI (e.g., along with the first TPC value), where each TPC field can respectively be for each closed loop index value. The UE 104 may firstly receive a first DCI which indicates a pair of joint TCIs or a pair of UL TCIs where each TCI may be associated with a set of power control parameters and/or a PL RS, and may later receive a second DCI scheduling a transmission of PUSCH or PUCCH with repetitions, where the pair of TCIs indicated in the first DCI are applied to transmit different repetitions of PUSCH or PUCCH for different TRPs, and the second DCI may additionally include two fields of transmit power control command for different repetitions of PUSCH or PUCCH.

In an example, the UE 104 can receive the second configuration from a base station 102. For example, in method 400, optionally at Block 408, a second configuration associating the first set of value with the first unified TCI state and the second set of values with the second unified TCI state can be transmitted. In an aspect, configuring component 352, e.g., in conjunction with processor(s) 312, memory 316, transceiver 302, BS communicating component 342, etc., can transmit the second configuration associating the first set of values with the first unified TCI state and the second set of values with the second unified TCI state. For example, configuring component 352 can transmit the second configuration to the UE 104 in RRC signaling, MAC-CE, DCI, and/or the like, as described above. The second configuration may include one or more of a set of values for power control parameters (P0, alpha, closed loop index) and/or a PL RS for the repetition associated with a TRP, a TPC field configured via RRC for per-TRP power control and/or activated in DCI (e.g., along with the first TPC value), etc., as described.

In one example, the UE may determine or select the separate values for the power control parameters for different TRPs from a set of values. For example, in method 500, optionally at Block 510, a second configuration indicating a set of P0 and/or alpha values (e.g., a P0-AlphaSet) common for multiple TCI states can be received. In an aspect, configuration applying component 252, e.g., in conjunction with processor(s) 212, memory 216, transceiver 202, UE communicating component 242, etc., can receive the second configuration indicating the set of P0 and/or alpha value (or other values) common for multiple TCI states. For example, configuration applying component 252 can receive the second configuration from the base station 102 in RRC signaling, MAC-CE, DCI, and/or the like. In an example, the second configuration can indicate a set of P0 and alpha values. In an example, when the unified TCI state or states are not associated with any power control parameters (e.g., in DCI, as described above), configuration applying component 252 can determine or select default values for the power control parameters for each unified TCI state and/or corresponding TRP for each repetition (e.g., per-TRP default P0, alpha, PL RS, closed loop index, etc.).

In some aspects, for different repetitions of PUCCH or PUSCH, the UE 104, or configuration applying component 252, may determine or select the first default set of values of the power control parameters for TRP1. For example, the UE may apply the first value in a P0-AlphaSet, the PL RS corresponding to the first unified TCI state, and a closed loop index 1=0 to transmit a repetition of the PUCCH or PUSCH for the TRP1. In an example, the PL RS corresponding to the first unified TCI state may be the source RS in the TCI, or the periodical RS QCLed to the source RS in the TCI. In addition, for example, the UE 104, or configuration applying component 252, may determine or select the default second set of values of the power control parameters (e.g., the second value in a P0-AlphaSet, the PL RS corresponding to the second unified TCI state, which can be received in the initial configuration at Block 502, closed loop index 1=1 if twoPUSCH/PUCCH-PC-AdjustmentStates is configured, 1=0 otherwise, etc.) for TRP2. For example, the UE may apply the second value in a P0-AlphaSet, the PL RS corresponding to the second unified TCI state, and a closed loop index 1=1 if twoPUSCH/PUCCH-PC-AdjustmentStates is configured, or 1=0 otherwise to transmit a repetition of the PUCCH or PUSCH for the TRP2. In this example, the PL RS corresponding to the second unified TCI state may be the source RS in the TCI, or the periodical RS QCLed to the source RS in the TCI. A P0-AlphaSet may be configured common to multiple TCIs, or configured for each TCI. For example, the UE 104 may firstly receive a first DCI which indicates a pair of joint TCIs or a pair of UL TCIs where each TCI may be not associated with any set of power control parameters and/or a PL RS, and may later receive a second DCI scheduling a transmission of PUSCH or PUCCH with repetitions, where the UE 104 may apply the pair of TCIs indicated in the first DCI to transmit different repetitions of PUSCH or PUCCH for different TRPs, and apply the first and the second default set of values of the power control parameters for transmitting different repetitions of PUSCH or PUCCH.

In an example, the UE 104 can receive the second configuration from a base station 102. For example, in method 400, optionally at Block 410, a second configuration indicating a set of P0 and/or alpha values (e.g., a P0-AlphaSet) common for multiple TCI states can be transmitted. In an aspect, configuring component 352, e.g., in conjunction with processor(s) 312, memory 316, transceiver 302, BS communicating component 342, etc., can transmit the second configuration indicating the set of P0 and/or alpha values (or other values) common for the multiple TCI states. For example, configuring component 352 can transmit the second configuration to the UE 104 in RRC signaling, MAC-CE, DCI, and/or the like, which may be along with the configuration transmitted at Block 402, etc., as described above. The second configuration may include at least the set of P0 and/or alpha values, an/or the RSs corresponding to the TCI states, as described.

In another example, the UE may determine or select the separate values for the power control parameters for different TRPs based on OLPC values. For example, in method 500, optionally at Block 512, a second configuration indicating an OLPC parameter can be received. In an aspect, configuration applying component 252, e.g., in conjunction with processor(s) 212, memory 216, transceiver 202, UE communicating component 242, etc., can receive the second configuration indicating the OLPC parameter (e.g., in DCI from base station 102). For example, the second configuration can include a OLPC set indication (e.g., in a DCI format 0_1 or 0_2 scheduling the PUSCH or in a DCI format 1_1 or 1_2 scheduling the PUCCH). In one example, the size of the OLPC set indication for the purpose of indicating power control parameter values for multiple TCI states may be 1 or 2 bits based on configuration per DCI format (and regardless of whether the SRI field is present in DCI or not). In another example, the second configuration can include an indication of a set of P0 values from which the power control parameter values (e.g., P0) can be selected or determined based on the OLPC set indication. The set of P0 values may be configured in RRC, DCI, etc.

For example, if a value of the field equals to ‘0’ or ‘00’, this can indicate that the UE 104 is to determine two values of P0 for two TRPs (one P0 value for each TRP) from the first and the second P0 values associated with the first and second unified TCIs. In another example, if a value of the field equals to ‘1’ or ‘01’, this can indicate that the UE 104 is to determine two first additional values of P0 for two TRPs (one additional P0 value for each TRP). In another example, if a value of the field equals to ‘10’ or ‘11’, this can indicate that the UE 104 is to determine two second additional values of P0 for two TRPs (one additional P0 value for each TRP). In yet another example, two first additional values may be from the first value in the first list (e.g., first P0-PUSCH-Set-r16_list) and the first value in the second list (e.g., second P0-PUSCH-Set-r16_list) and two second additional values may be from the second value in the first list and the second value in the second list. In this example, configuration applying component 252 can determine the power control parameter values for each of the multiple unified TCI states based on the values of the OLPC set indication and the rules explained above. For example, the UE 104 may firstly receive a first DCI which indicates a pair of joint TCIs or a pair of UL TCIs, and may later receive a second DCI scheduling a transmission of PUSCH or PUCCH with repetitions, where the UE 104 may apply the pair of TCIs indicated in the first DCI to transmit different repetitions of PUSCH or PUCCH for different TRPs, and determine the first and the second P0 values indicated by the OLPC field in the second DCI for transmitting different repetitions of PUSCH or PUCCH.

In an example, the UE 104 can receive the second configuration from a base station 102. For example, in method 400, optionally at Block 412, a second configuration indicating an OLPC parameter can be transmitted. In an aspect, configuring component 352, e.g., in conjunction with processor(s) 312, memory 316, transceiver 302, BS communicating component 342, etc., can transmit the second configuration indicating the OLPC parameter. For example, configuring component 352 can transmit the second configuration to the UE 104 in DCI. The second configuration may include at least the OLPC set indication and/or a set of P0 values, as described, which may be configured in RRC, DCI, etc.

Figure 6:
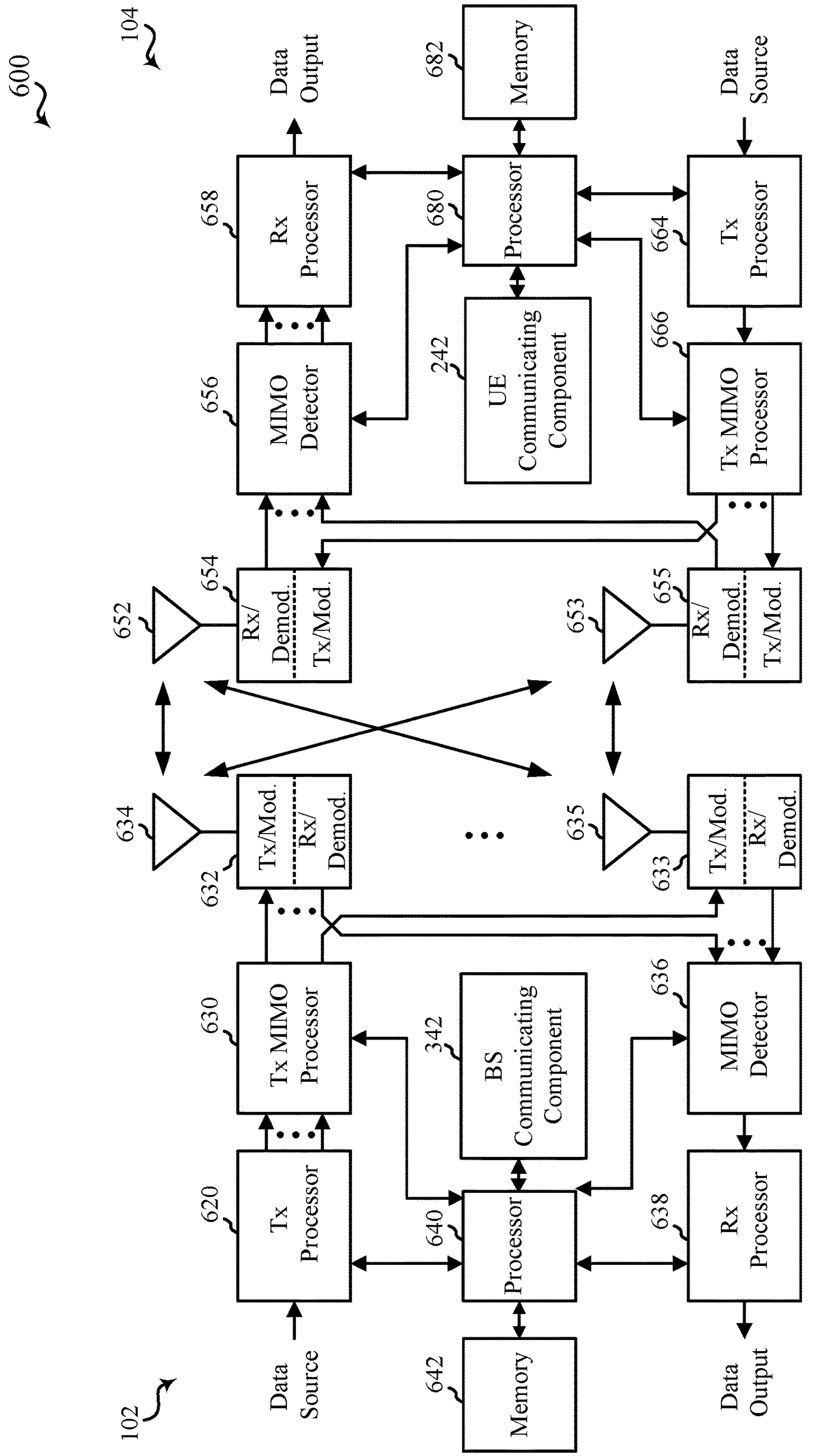
FIG. 6 is a block diagram illustrating an example of a multiple-input multiple-output (MIMO) communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a “layer” and the “rank” of the communication link may indicate the number of layers used for communication. For example, in a 2×2 MIMO communication system where base station 102 transmits two “layers,” the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a UE communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a BS communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 600.

Additionally, an Appendix is attached and includes additional description and figures relating to the present disclosure.

The following aspects are illustrative only and aspects thereof may be combined with aspects of other embodiments or teaching described herein, without limitation.

Aspect 1 is a method for wireless communication at a UE including receiving a configuration indicating a first unified TCI state for using to transmit a first repetition of a transmission to a first TRP and a second unified TCI state for using the transmit a second repetition of the transmission to a second TRP, transmitting, to the first TRP, the first repetition of the transmission using the first unified TCI state and based on a first set of values for a set of power control parameters, and transmitting, to the second TRP, the second repetition of the transmission using the second unified TCI state and based on a second set of values for the set of power control parameters.

In Aspect 2, the method of Aspect 1 includes receiving a second configuration associating the first set of values with the first unified TCI state and the second set of values with the second unified TCI state.

In Aspect 3, the method of Aspect 2 includes where the second configuration indicates the first set of values and the second set of values for the power control parameters including one or more of a P0, alpha, a closed loop index, or a path loss reference signal.

In Aspect 4, the method of Aspect 3 includes where transmitting the first repetition based on the first set of values and transmitting the second repetition based on the second set of values is based on values for the closed loop index in the first set of values and the second set of values being different from one another.

In Aspect 5, the method of any of Aspects 2 to 4 includes where the second configuration includes a transmit power command field that is one or more of configured via RRC or indicated in DCI for scheduling the transmission.

In Aspect 6, the method of Aspect 5 includes where when the second configuration includes the transmit power command field configured via RRC, the DCI indicates the transmit power command field including the second set of values along with an initial transmit power command field including first set of values.

In Aspect 7, the method of any of Aspects 1 to 6 includes receiving a second configuration indicating a set of P0 and alpha values common for multiple TCI states, where the first set of values includes a first P0 and alpha value from the set of P0 and alpha values, an indication of a first path loss reference signal associated with the first unified TCI state, and a first closed loop index, and where the second set of values includes a second P0 and alpha value from the set of P0 and alpha values, an indication of a second path loss reference signal associated with the second unified TCI state, and a second closed loop index.

In Aspect 8, the method of Aspect 7 includes measuring the first path loss reference signal for transmitting the first repetition, where the first path loss reference signal is one of a source reference signal in the first unified TCI state or a periodical reference signal quasi-colocated to the source reference signal in the first unified TCI state.

In Aspect 9, the method of Aspect 8 includes measuring the second path loss reference signal for transmitting the second repetition, where the second path loss reference signal is one of a source reference signal in the second unified TCI state or a periodical reference signal quasi-colocated to the source reference signal in the second unified TCI state.

In Aspect 10, the method of any of Aspects 7 to 9 includes where when at least two adjustment states are configured, the first closed loop index value is different from the second closed loop index value, or when less than two adjustment states are configured, the first closed loop index value is same as the second closed loop index value.

In Aspect 11, the method of any of Aspects 1 to 10 includes receiving a second configuration indicating an open loop power control parameter in downlink control information, where the first set of values and the second set of values are based on the open loop power control parameter.

In Aspect 12, the method of Aspect 11 includes where based on a value of the open loop power control, the first set of values includes a first P0 for the first TRP associated with the first unified TCI state and the second set of values includes a second P0 for the second TRP associated with the second unified TCI state.

In Aspect 13, the method of Aspect 11 includes where based on a value of the open loop power control, the first set of values includes a first P0 for the first TRP indicated in a first P0 set of values for an uplink channel and the second set of values includes a second P0 for the second TRP indicated in a second P0 set of values for the uplink channel.

In Aspect 14, the method of Aspect 11 includes where based on a value of the open loop power control, the first set of values includes a first P0 for the first TRP indicated as a second one in a first P0 set of values for an uplink channel and the second set of values includes a second P0 for the second TRP indicated as a second one in a second P0 set of values for the uplink channel.

In Aspect 15, the method of any of Aspects 1 to 14 includes where the transmission includes a PUCCH transmission or a PUSCH transmission.

Aspect 16 is a method for wireless communication at a base station including transmitting, to a UE, a configuration indicating a first unified TCI state for using to transmit a first repetition of a transmission to a first TRP and a second unified state for using to transmit a second repetition of the transmission to a second TRP, receiving, at the first TRP, the first repetition of the transmission using the first unified TCI state and based on a first set of values for a set of power control parameters, and receiving, at the second TRP, the second repetition of the transmission using the second unified TCI state and based on a second set of values for the set of power control parameters.

In Aspect 17, the method of Aspect 16 includes transmitting, to the UE, a second configuration associating the first set of values with the first unified TCI state and the second set of values with the second unified TCI state.

In Aspect 18, the method of Aspect 17 includes where the second configuration indicates the first set of values and the second set of values for the power control parameters including one or more of a P0, alpha, a closed loop index, or a path loss reference signal.

In Aspect 19, the method of any of Aspects 17 or 18 includes where the second configuration includes a transmit power command field that is one or more of configured via RRC or indicated in DCI for scheduling the transmission.

In Aspect 20, the method of Aspect 19 includes where when the second configuration includes the transmit power command field configured via RRC, the DCI indicates the transmit power command field including the second set of values along with an initial transmit power command field including first set of values.

In Aspect 21, the method of any of Aspects 16 to 20 includes transmitting, to the UE, a second configuration indicating a set of P0 and alpha values common for multiple TCI states, where the first set of values includes a first P0 and alpha value from the set of P0 and alpha values, an indication of a first path loss reference signal associated with the first unified TCI state, and a first closed loop index, and where the second set of values includes a second P0 and alpha value from the set of P0 and alpha values, an indication of a second path loss reference signal associated with the second unified TCI state, and a second closed loop index.

In Aspect 22, the method of Aspect 21 includes transmitting, to the UE, the first path loss reference signal for transmitting the first repetition, where the first path loss reference signal is one of a source reference signal in the first unified TCI state or a periodical reference signal quasi-colocated to the source reference signal in the first unified TCI state.

In Aspect 23, the method of Aspect 22 includes transmitting, to the UE, the second path loss reference signal for transmitting the second repetition, where the second path loss reference signal is one of a source reference signal in the second unified TCI state or a periodical reference signal quasi-colocated to the source reference signal in the second unified TCI state.

In Aspect 24, the method of any of Aspects 21 to 23 includes where when at least two adjustment states are configured, the first closed loop index value is different from the second closed loop index value, or when less than two adjustment states are configured, the first closed loop index value is same as the second closed loop index value.

In Aspect 25, the method of any of Aspects 16 to 24 includes transmitting, to the UE, a second configuration indicating an open loop power control parameter in downlink control information, where the first set of values and the second set of values are based on the open loop power control parameter.

In Aspect 26, the method of Aspect 25 includes where based on a value of the open loop power control, the first set of values includes a first P0 for the first TRP associated with the unified TCI state and the second set of values includes a second P0 for the second TRP associated with a second unified TCI state.

In Aspect 27, the method of Aspect 25 includes where based on a value of the open loop power control, the first set of values includes a first P0 for the first TRP indicated in a first P0 set of values for an uplink channel and the second set of values includes a second P0 for the second TRP indicated in a second P0 set of values for the uplink channel.

In Aspect 28, the method of Aspect 25 includes where based on a value of the open loop power control, the first set of values includes a first P0 for the first TRP indicated as a second one in a first P0 set of values for an uplink channel and the second set of values includes a second P0 for the second TRP indicated as a second one in a second P0 set of values for the uplink channel.

In Aspect 29, the method of any of Aspects 16 to 24 includes where the transmission includes a PUCCH transmission or a PUSCH transmission.

Aspect 30 is an apparatus for wireless communication including a transceiver, a memory configured to store instructions, and one or more processors communicatively coupled with the memory and the transceiver, where the one or more processors are configured to execute the instructions to cause the apparatus to perform any of the methods of Aspects 1 to 29.

Aspect 31 is an apparatus for wireless communication including means for performing any of the methods of Aspects 1 to 29.

Aspect 32 is a computer-readable medium including code executable by one or more processors for wireless communications, the code including code for performing any of the methods of Aspects 1 to 29.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
- a transceiver;
- a memory configured to store instructions; and
- one or more processors communicatively coupled with the memory and the transceiver, wherein the one or more processors are configured to:
  - receive a configuration indicating a first unified transmission configuration indicator (TCI) state for using to transmit a first repetition of a transmission to a first transmission/reception point (TRP) and a second unified TCI state for using to transmit a second repetition of the transmission to a second TRP;
  - receive a second configuration associated with a first set of values for a set of power control parameters and a second set of values for a set of power control parameters, wherein the second configuration one of:
    - associates the first set of values with the first unified TCI state and the second set of values with the second unified TCI state;
    - indicates a set of P0 and alpha values common for multiple TCI states, wherein the first set of values includes a first P0 and alpha value from the set of P0 and alpha values, an indication of a first path loss reference signal associated with the first unified TCI state, and a first closed loop index, and wherein the second set of values includes a second P0 and alpha value from the set of P0 and alpha values, an indication of a second path loss reference signal associated with the second unified TCI state, and a second closed loop index; or
    - indicates an open loop power control parameter in downlink control information, wherein the first set of values and the second set of values are based on the open loop power control parameter, wherein based on a value of the open loop power control parameter, the first set of values includes a first P0 for the first TRP indicated as a second one in a first P0 set of values for an uplink channel and the second set of values includes a second P0 for the second TRP indicated as a second one in a second P0 set of values for the uplink channel;
  - transmit, to the first TRP, the first repetition of the transmission using the first unified TCI state and based on the first set of values; and
  - transmit, to the second TRP, the second repetition of the transmission using the second unified TCI state and based on the second set of values.

2. The apparatus of claim 1, wherein the second configuration associates the first set of values with the first unified TCI state and the second set of values with the second unified TCI state.

3. The apparatus of claim 2, wherein the second configuration indicates the first set of values and the second set of values for the set of power control parameters including one or more of a P0, alpha, a closed loop index, or a path loss reference signal.

4. The apparatus of claim 3, wherein the one or more processors are configured to transmit the first repetition based on the first set of values and transmit the second repetition based on the second set of values based on values for the closed loop index in the first set of values and the second set of values being different from one another.

5. The apparatus of claim 2, wherein the second configuration includes a transmit power command field that is one or more of configured via radio resource control (RRC) or indicated in downlink control information (DCI) for scheduling the transmission.

6. The apparatus of claim 5, wherein when the second configuration includes the transmit power command field configured via RRC, the DCI indicates the transmit power command field including the second set of values along with an initial transmit power command field including first set of values.

7. The apparatus of claim 1, wherein the second configuration indicates the set of P0 and alpha values common for multiple TCI states.

8. The apparatus of claim 7, wherein the one or more processors are further configured to measure the first path loss reference signal for transmitting the first repetition, wherein the first path loss reference signal is one of a source reference signal in the first unified TCI state or a periodical reference signal quasi-colocated to the source reference signal in the first unified TCI state.

9. The apparatus of claim 8, wherein the one or more processors are further configured to measure the second path loss reference signal for transmitting the second repetition, wherein the second path loss reference signal is one of a source reference signal in the second unified TCI state or a periodical reference signal quasi-colocated to the source reference signal in the second unified TCI state.

10. The apparatus of claim 7, wherein when at least two adjustment states are configured, the first closed loop index value is different from the second closed loop index value, or when less than two adjustment states are configured, the first closed loop index value is same as the second closed loop index value.

11. The apparatus of claim 1, wherein the transmission includes a physical uplink control channel (PUCCH) transmission or a physical uplink shared channel (PUSCH) transmission.

12. An apparatus for wireless communication, comprising:

a transceiver;

a memory configured to store instructions; and one or more processors communicatively coupled with the memory and the transceiver, wherein the one or more processors are configured to:

transmit, to a user equipment (UE), a configuration indicating a first unified transmission configuration indicator (TCI) state for using to transmit a first repetition of a transmission to a first transmission/reception point (TRP) and a second unified state for using to transmit a second repetition of the transmission to a second TRP;

transmit, to the UE, a second configuration associated with a first set of values for a set of power control parameters and a second set of values for a set of power control parameters, wherein the second configuration one of:

associates the first set of values with the first unified TCI state and the second set of values with the second unified TCI state;

indicates a set of P0 and alpha values common for multiple TCI states, wherein the first set of values includes a first P0 and alpha value from the set of P0 and alpha values, an indication of a first path loss reference signal associated with the first unified TCI state, and a first closed loop index, and wherein the second set of values includes a second P0 and alpha value from the set of P0 and alpha values, an indication of a second path loss reference signal associated with the second unified TCI state, and a second closed loop index; or indicates an open loop power control parameter in downlink control information, wherein the first set of values and the second set of values are based on the open loop power control parameter, wherein based on a value of the open loop power control parameter, the first set of values includes a first P0 for the first TRP indicated as a second one in a first P0 set of values for an uplink channel and the second set of values includes a second P0 for the second TRP indicated as a second one in a second P0 set of values for the uplink channel;

receive, at the first TRP, the first repetition of the transmission using the first unified TCI state and based on the first set of values; and receive, at the second TRP, the second repetition of the transmission using the second unified TCI state and based on the second set of values.

13. The apparatus of claim 12, wherein the second configuration associates the first set of values with the first unified TCI state and the second set of values with the second unified TCI state.

14. The apparatus of claim 13, wherein the second configuration indicates the first set of values and the second set of values for the set of power control parameters including one or more of a P0, alpha, a closed loop index, or a path loss reference signal.

15. The apparatus of claim 13, wherein the second configuration includes a transmit power command field that is one or more of configured via radio resource control (RRC) or indicated in downlink control information (DCI) for scheduling the transmission.

16. The apparatus of claim 15, wherein when the second configuration includes the transmit power command field configured via RRC, the DCI indicates the transmit power command field including the second set of values along with an initial transmit power command field including first set of values.

17. The apparatus of claim 12, wherein the second configuration indicates the set of P0 and alpha values common for multiple TCI states.

18. The apparatus of claim 17, wherein the one or more processors are further configured to transmit, to the UE, the first path loss reference signal for transmitting the first repetition, wherein the first path loss reference signal is one of a source reference signal in the first unified TCI state or a periodical reference signal quasi-colocated to the source reference signal in the first unified TCI state.

19. The apparatus of claim 18, wherein the one or more processors are further configured to transmit, to the UE, the second path loss reference signal for transmitting the second repetition, wherein the second path loss reference signal is one of a source reference signal in the second unified TCI state or a periodical reference signal quasi-colocated to the source reference signal in the second unified TCI state.

20. The apparatus of claim 17, wherein when at least two adjustment states are configured, the first closed loop index value is different from the second closed loop index value, or when less than two adjustment states are configured, the first closed loop index value is same as the second closed loop index value.

21. The apparatus of claim 12, wherein the transmission includes a physical uplink control channel (PUCCH) transmission or a physical uplink shared channel (PUSCH) transmission.

22. A method for wireless communication at a user equipment (UE), comprising:

receiving a configuration indicating a first unified transmission configuration indicator (TCI) state for using to transmit a first repetition of a transmission to a first transmission/reception point (TRP) and a second unified TCI state for using to transmit a second repetition of the transmission to a second TRP;

receiving a second configuration associated with a first set of values for a set of power control parameters and a second set of values for a set of power control parameters, wherein the second configuration one of:

associates the first set of values with the first unified TCI state and the second set of values with the second unified TCI state;

indicates a set of P0 and alpha values common for multiple TCI states, wherein the first set of values includes a first P0 and alpha value from the set of P0 and alpha values, an indication of a first path loss reference signal associated with the first unified TCI state, and a first closed loop index, and wherein the second set of values includes a second P0 and alpha value from the set of P0 and alpha values, an indication of a second path loss reference signal associated with the second unified TCI state, and a second closed loop index; or indicates an open loop power control parameter in downlink control information, wherein the first set of values and the second set of values are based on the open loop power control parameter, wherein based on a value of the open loop power control parameter, the first set of values includes a first P0 for the first TRP indicated as a second one in a first P0 set of values for an uplink channel and the second set of values includes a second P0 for the second TRP indicated as a second one in a second P0 set of values for the uplink channel;

transmitting, to the first TRP, the first repetition of the transmission using the first unified TCI state and based on the first set of values; and transmitting, to the second TRP, the second repetition of the transmission using the second unified TCI state and based on the second set of values.

23. A method for wireless communication at a base station, comprising:

transmitting, to a user equipment (UE), a configuration indicating a first unified transmission configuration indicator (TCI) state for using to transmit a first repetition of a transmission to a first transmission/reception point (TRP) and a second unified state for using to transmit a second repetition of the transmission to a second TRP;

transmitting, to the UE, a second configuration associated with a first set of values for a set of power control parameters and a second set of values, wherein the second configuration one of:

associates the first set of values with the first unified TCI state and the second set of values with the second unified TCI state;

indicates a set of P0 and alpha values common for multiple TCI states, wherein the first set of values includes a first P0 and alpha value from the set of P0 and alpha values, an indication of a first path loss reference signal associated with the first unified TCI state, and a first closed loop index, and wherein the second set of values includes a second P0 and alpha value from the set of P0 and alpha values, an indication of a second path loss reference signal associated with the second unified TCI state, and a second closed loop index; or indicates an open loop power control parameter in downlink control information, wherein the first set of values and the second set of values are based on the open loop power control parameter, wherein based on a value of the open loop power control parameter, the first set of values includes a first P0 for the first TRP indicated as a second one in a first P0 set of values for an uplink channel and the second set of values includes a second P0 for the second TRP indicated as a second one in a second P0 set of values for the uplink channel;

receiving, at the first TRP, the first repetition of the transmission using the first unified TCI state and based on the first set of values; and receiving, at the second TRP, the second repetition of the transmission using the second unified TCI state and based on the second set of values.

24. The method of claim 22, wherein the second configuration associates the first set of values with the first unified TCI state and the second set of values with the second unified TCI state, and wherein the second configuration indicates the first set of values and the second set of values for a set of power control parameters including one or more of a P0, alpha, a closed loop index, or a path loss reference signal.

25. The method of claim 24, wherein transmitting the first repetition is based on the first set of values and transmitting the second repetition is based on the second set of values based on values for the closed loop index in the first set of values and the second set of values being different from one another.

26. The method of claim 22, wherein the second configuration associates the first set of values with the first unified TCI state and the second set of values with the second unified TCI state, and wherein the second configuration includes a transmit power command field that is one or more of configured via radio resource control (RRC) or indicated in downlink control information (DCI) for scheduling the transmission.

27. The method of claim 26, wherein when the second configuration includes the transmit power command field configured via RRC, the DCI indicates the transmit power command field including the second set of values along with an initial transmit power command field including first set of values.

28. The method of claim 22, wherein the transmission includes a physical uplink control channel (PUCCH) transmission or a physical uplink shared channel (PUSCH) transmission.

29. The method of claim 23, wherein the second configuration associates the first set of values with the first unified TCI state and the second set of values with the second unified TCI state, and wherein the second configuration indicates the first set of values and the second set of values for the power control parameters including one or more of a P0, alpha, a closed loop index, or a path loss reference signal.

30. The method of claim 23, wherein the second configuration associates the first set of values with the first unified TCI state and the second set of values with the second unified TCI state, and wherein the second configuration includes a transmit power command field that is one or more of configured via radio resource control (RRC) or indicated in downlink control information (DCI) for scheduling the transmission.

* * * * *